US008385513B2

(12) United States Patent
Howell et al.

(10) Patent No.: US 8,385,513 B2
(45) Date of Patent: Feb. 26, 2013

(54) PROCESSING A RECEIVED VOICEMAIL MESSAGE

(75) Inventors: David A Howell, Seattle, WA (US); David Milstein, Redmond, WA (US); Linda Criddle, Kirkland, WA (US); Philip A Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1385 days.

(21) Appl. No.: 11/445,057

(22) Filed: May 31, 2006

(65) Prior Publication Data

US 2007/0280434 A1 Dec. 6, 2007

(51) Int. Cl.
*H04M 1/64* (2006.01)
(52) U.S. Cl. .......................................... 379/67.1; 379/13
(58) Field of Classification Search ..... 379/88.01–88.28
See application file for complete search history.

(56) References Cited

U.S. PATENT DOCUMENTS

| 5,568,540 | A | | 10/1996 | Greco | |
| 5,579,472 | A | * | 11/1996 | Keyworth et al. | 715/751 |
| 6,044,134 | A | * | 3/2000 | De La Huerga | 379/88.08 |
| 6,181,780 | B1 | | 1/2001 | Finnigan | 379/67.1 |
| 6,606,373 | B1 | * | 8/2003 | Martin | 379/88.01 |
| 6,868,143 | B1 | * | 3/2005 | Menon et al. | 379/88.13 |
| 6,876,729 | B1 | | 4/2005 | Kuter et al. | 379/88.22 |
| 7,065,187 | B2 | * | 6/2006 | Myers et al. | 379/88.22 |
| 7,203,286 | B1 | * | 4/2007 | Brockenbrough et al. | 379/76 |
| 7,216,221 | B2 | * | 5/2007 | Bear et al. | 713/1 |
| 7,359,493 | B1 | | 4/2008 | Wang et al. | 379/88.23 |
| 7,568,151 | B2 | * | 7/2009 | Bargeron et al. | 715/231 |
| 7,738,636 | B1 | | 6/2010 | Wageman | |
| 2002/0075815 | A1 | | 6/2002 | Sharma et al. | 370/276 |
| 2003/0128820 | A1 | * | 7/2003 | Hirschberg et al. | 379/88.14 |
| 2005/0037739 | A1 | | 2/2005 | Zhong | |
| 2005/0238147 | A1 | * | 10/2005 | Carro | 379/88.13 |
| 2006/0087978 | A1 | | 4/2006 | Sullivan et al. | 370/242 |
| 2007/0280435 | A1 | | 12/2007 | Smith, Jr. | 379/88.16 |

OTHER PUBLICATIONS (User's Guide) Creative Sound Blaster Live! Digital Enterainment 5.1, Creative Audio Software, Oct. 2000, Creative Technology Ltd. pages 1-66.*
Office Action mailed Oct. 27, 2009, issued in U.S. Appl. No. 11/446,346.
Office Action mailed Apr. 14, 2010, issued in U.S. Appl. No. 11/446,346.
Office Action mailed Jun. 7, 2012, in U.S. Appl. No. 11/446,346.
Office Action mailed Oct. 17, 2012, in U.S. Appl. No. 11/446,346.

* cited by examiner

*Primary Examiner* — Yuwen Pan
*Assistant Examiner* — Assad Mohammed
(74) *Attorney, Agent, or Firm* — Merchant & Gould

(57) ABSTRACT

Aspects of the present invention are directed at software for processing a received voicemail message to provide enhanced features in a voicemail system. In one embodiment, a user interface is provided where a callee may generate events to modify audio attributes of a received voicemail message. When an event to modify the audio attributes of the received voicemail message is received, aspects of the present invention obtain a set of event data that describes input generated by the callee. Then, a media player program is used to modify attributes of the data packets in the voicemail message in accordance with the input received from the callee.

20 Claims, 14 Drawing Sheets

PROCESSING A RECEIVED VOICEMAIL MESSAGE

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, with existing VoIP Technology, a callee is not able to obtain certain contextual information with a voicemail message. For example, a callee may want to obtain a voicemail message summary in which data identified as being highly relevant is made available without a callee being required to listen to the body of the voicemail message. Moreover, a callee may also want to modify the audio included with a received voicemail message.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at software for processing a received voicemail message to provide enhanced features in a voicemail system. In one embodiment, a user interface is provided where a callee may generate events to modify audio attributes of a received voicemail message. When an event to modify the audio attributes of the received voicemail message is received, aspects of the present invention obtain a set of event data that describes input generated by the callee. Then, a media player program is used to modify attributes of the data packets in the voicemail message in accordance with the input received from the callee. As a result, a callee may modify the audio attributes of a received voicemail message, for example, to improve the audio quality of the voicemail message.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention is directed at software that processes a received voicemail message to provide enhanced features in a voicemail system. In one embodiment, audio data is processed to provide enhanced contextual data such as a summary of a received voicemail message. In another embodiment, controls are provided that allow a callee to navigate and/or modify the audio data that is included in a received voicemail message. Although the present invention will be described in connection with an IP telephony environment, it is equally applicable to any type of digital data exchange that includes audio. Accordingly, the disclosed embodiments and examples are illustrative in nature and should not be construed as limiting.

Figure 1:
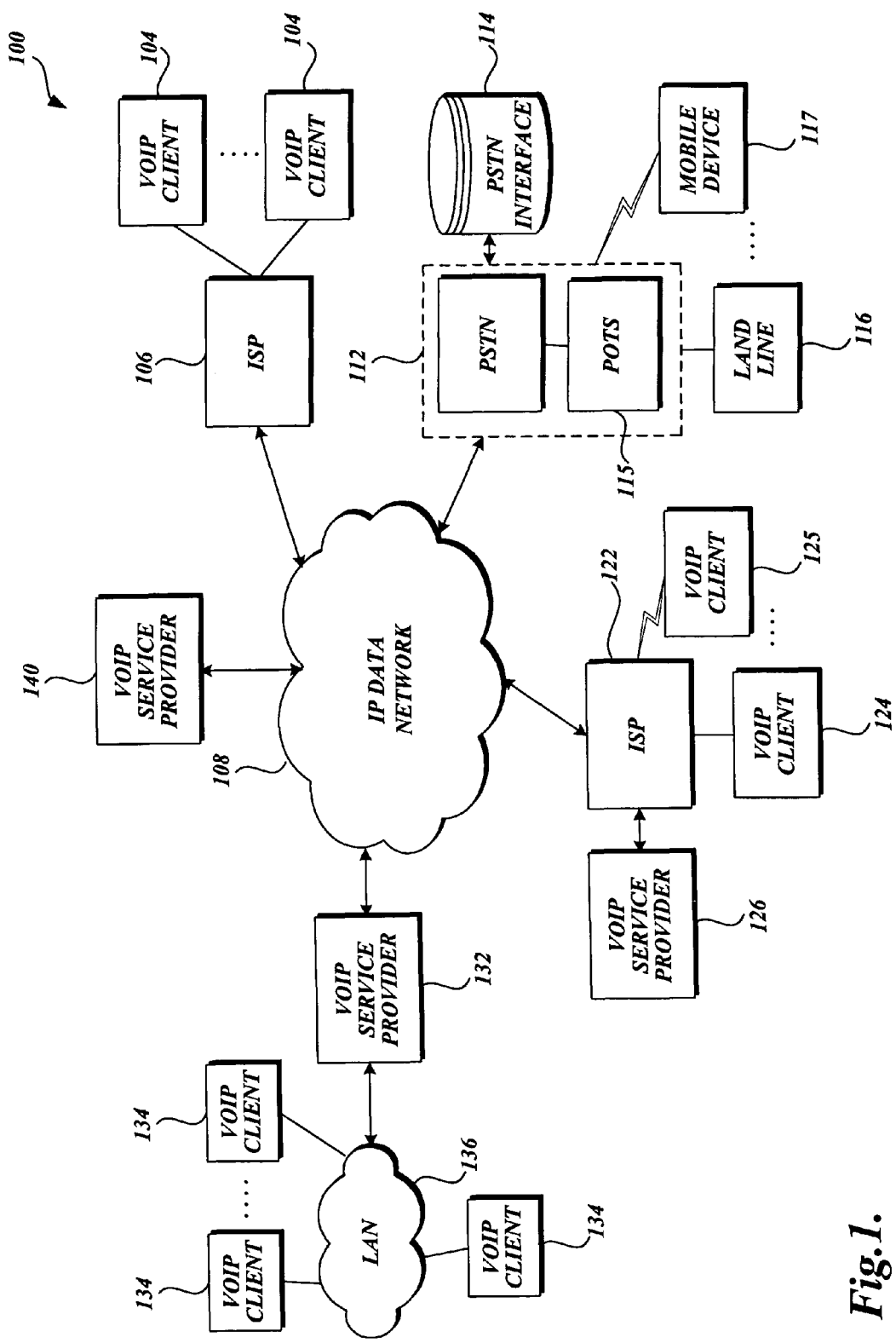
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client" or "client," as used herein, refers to a particular contact point, such as an individual, an organization, a company, etc., one or more associated VoIP devices, and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of priority information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like), and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116, may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.). Moreover, the capabilities of the device used to access a communication may be assessed to determine how contextual data related to a call will be made available to a callee.

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
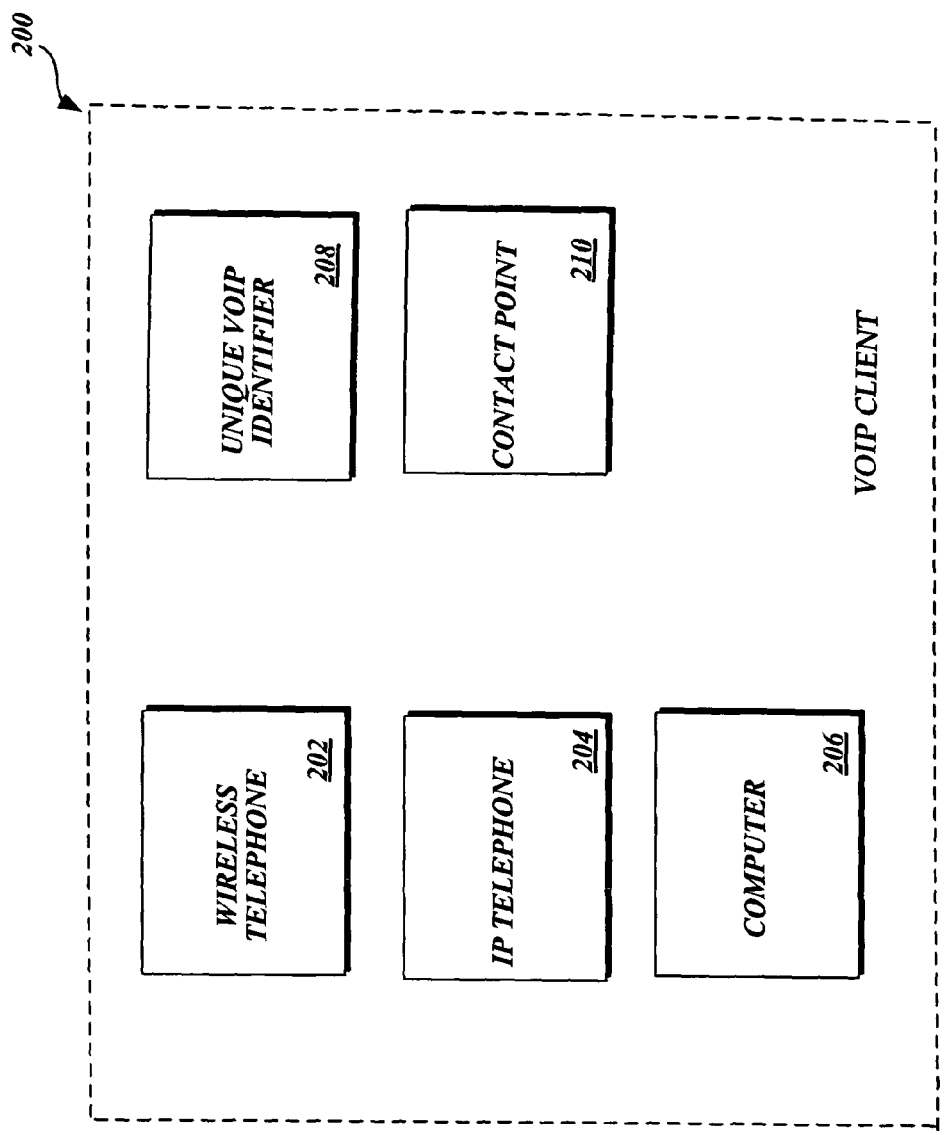
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voicemail messages, address books, client specified rules, preferences relating to a voicemail system, priority information related to incoming calls, etc. Alternatively, or in addition thereto, a separate storage, maintained for example by a service provider, may be associated with the VoIP client and accessible by each VoIP device that contains information relating to the VoIP client. For example, a service provider may provide a voicemail system where a caller may leave a voicemail message for a callee. Each user may be provided with a voicemail box maintained on separate storage associated with the service provider. In an embodiment, any suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
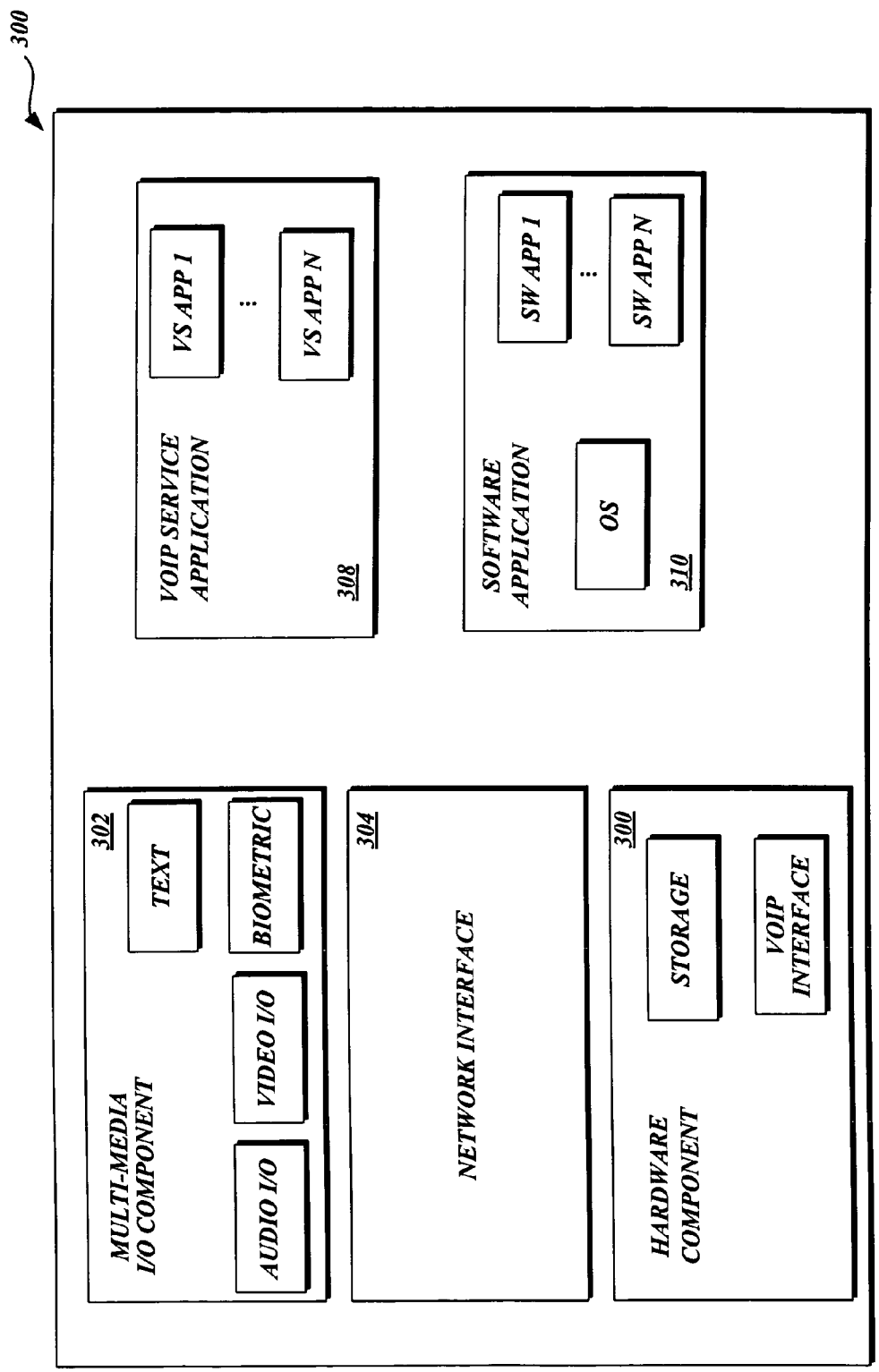
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, voicemail preferences, etc.) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

In one embodiment, the software application component 310 includes a program for accessing a voicemail box that stores voicemail messages for a callee. In this regard, the program for accessing a voicemail box may be an e-mail application, voicemail application, or any other application capable of accessing data from remote storage.

Figure 4A:
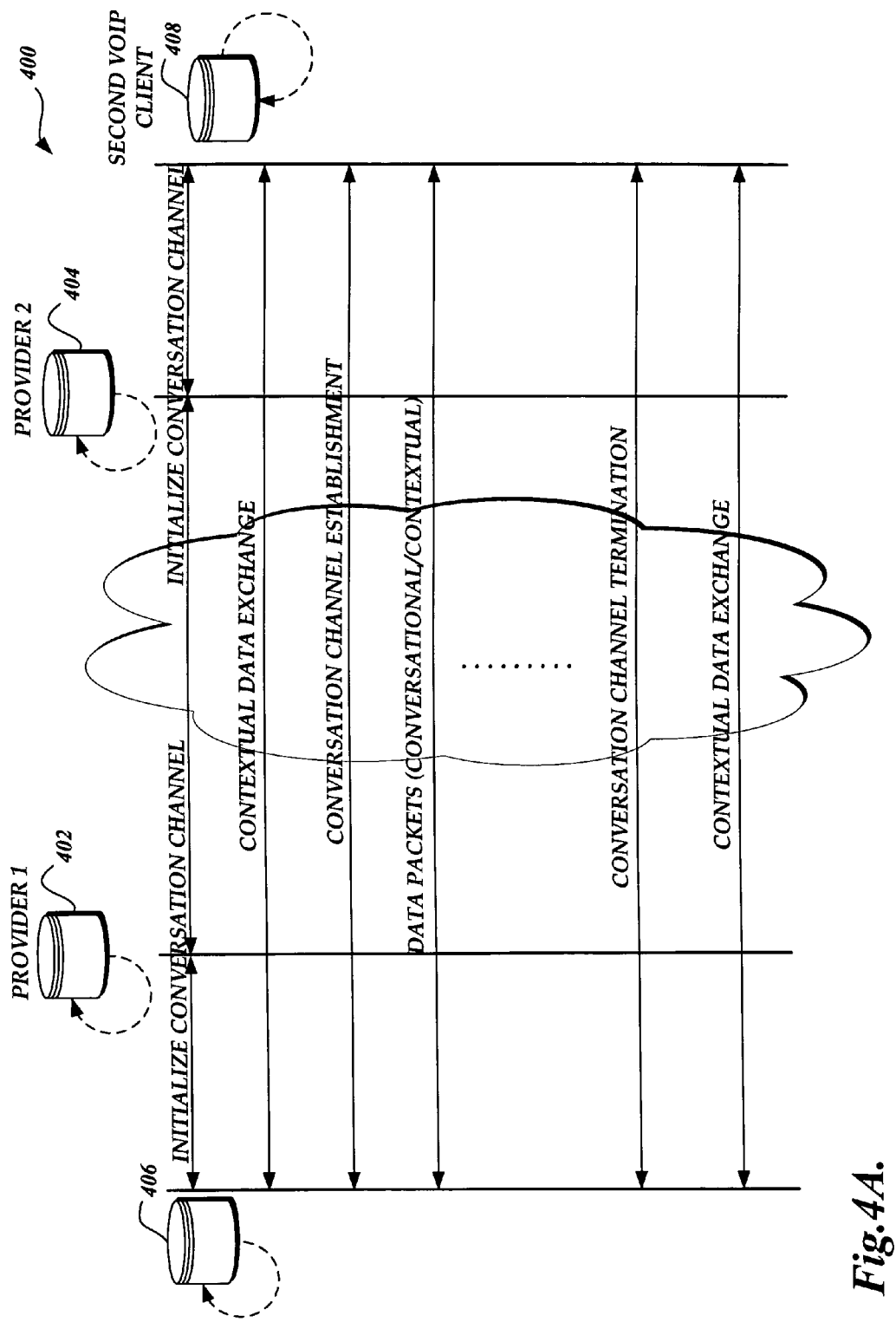
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established. In one embodiment, if a conversation channel cannot be established because a callee is unavailable, Provider 2 404 forwards the request to a client that provides a voicemail system. In this instance, the second VoIP 406 may be used to access conversation and contextual data obtained by the client(s) that provide the voicemail system. While some of the discussion provided below describes the exchange of data occurring in real-time communications, this discussion also applies to static communication, such as voicemail messages.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. In this regard, if a callee is unavailable, the request may be forwarded to a client that provides a voicemail system. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
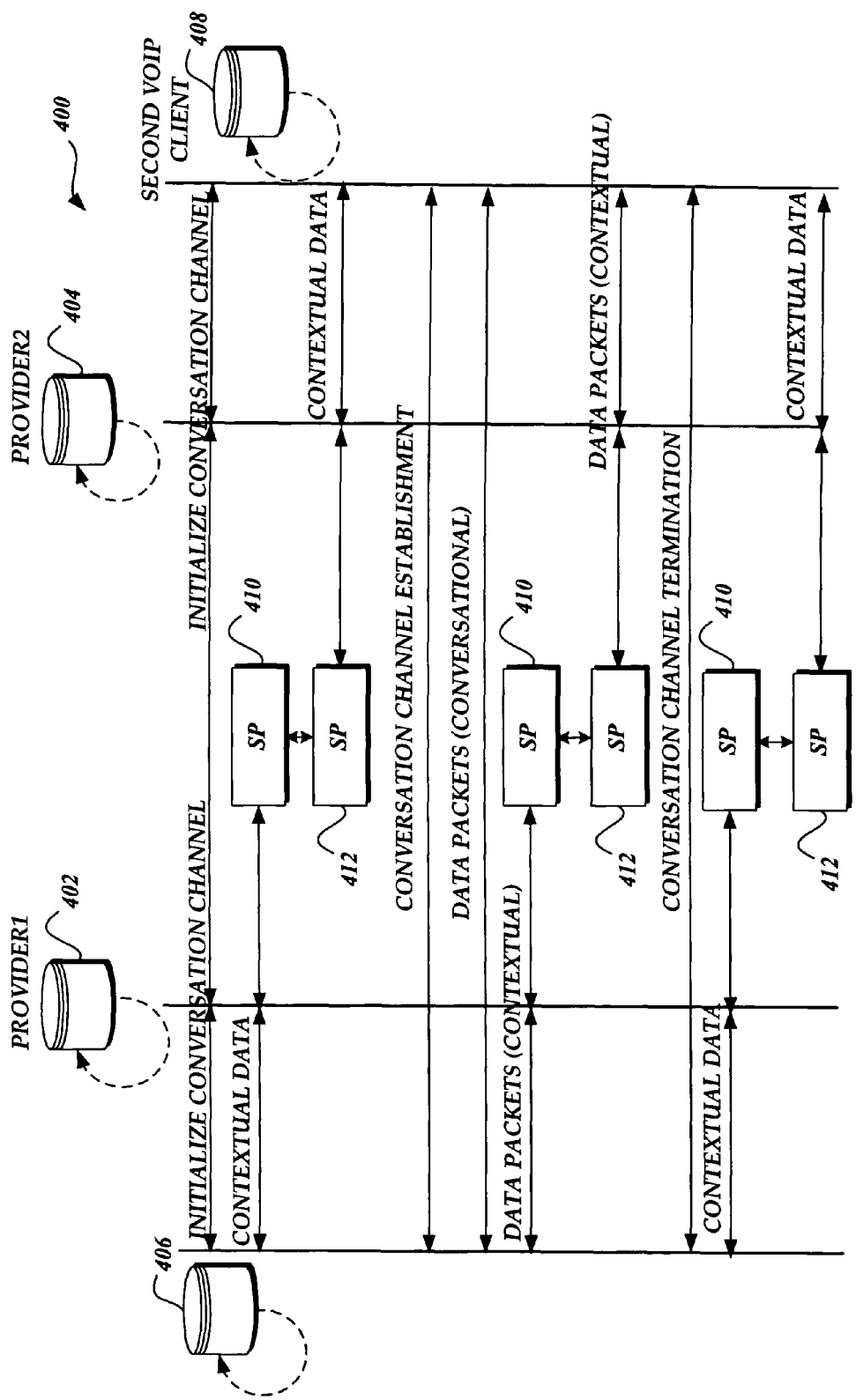

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
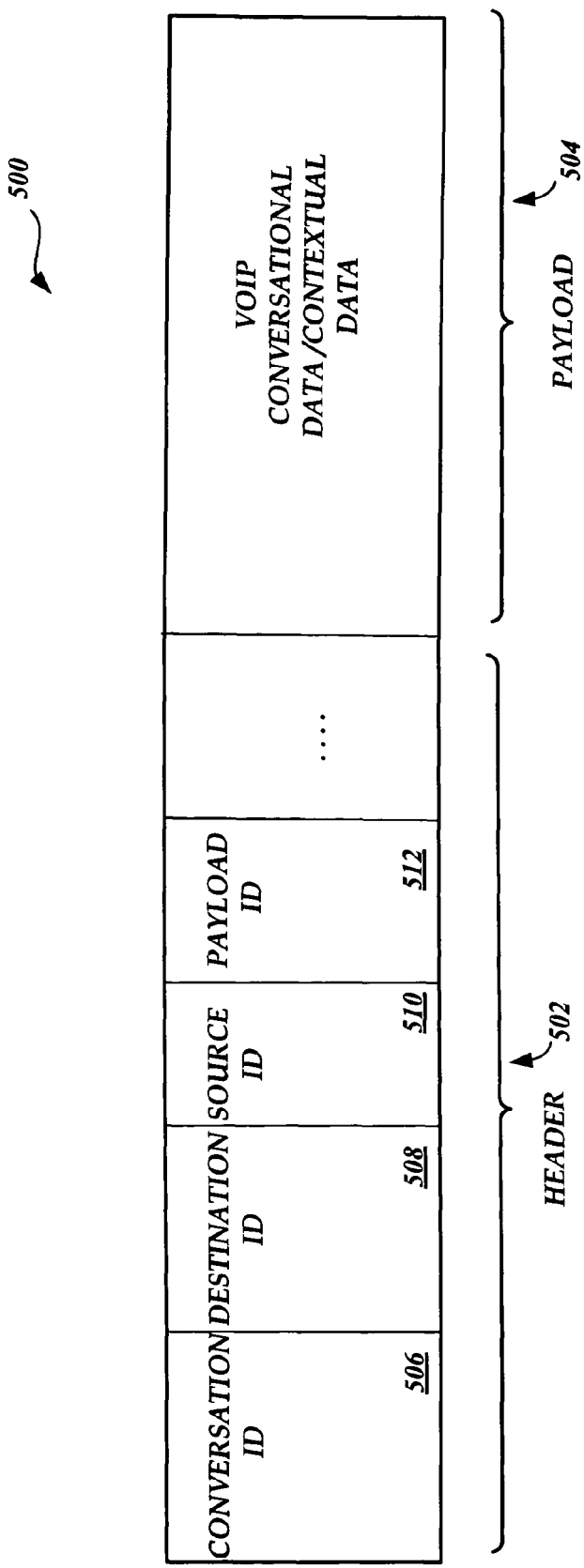
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. In this regard, a VoIP service provider or other VoIP entities may modify header information in certain circumstances. For example, if a caller is being forwarded to a voicemail system, the original destination of a data packet may be modified to a client that provides a voicemail system.

Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, voicemail preferences, and the like. The contextual information may be processed and collected at each VoIP client and/or the VoIP service providers depending on the nature of the contextual data. In one aspect, the VoIP service providers may add, modify, and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
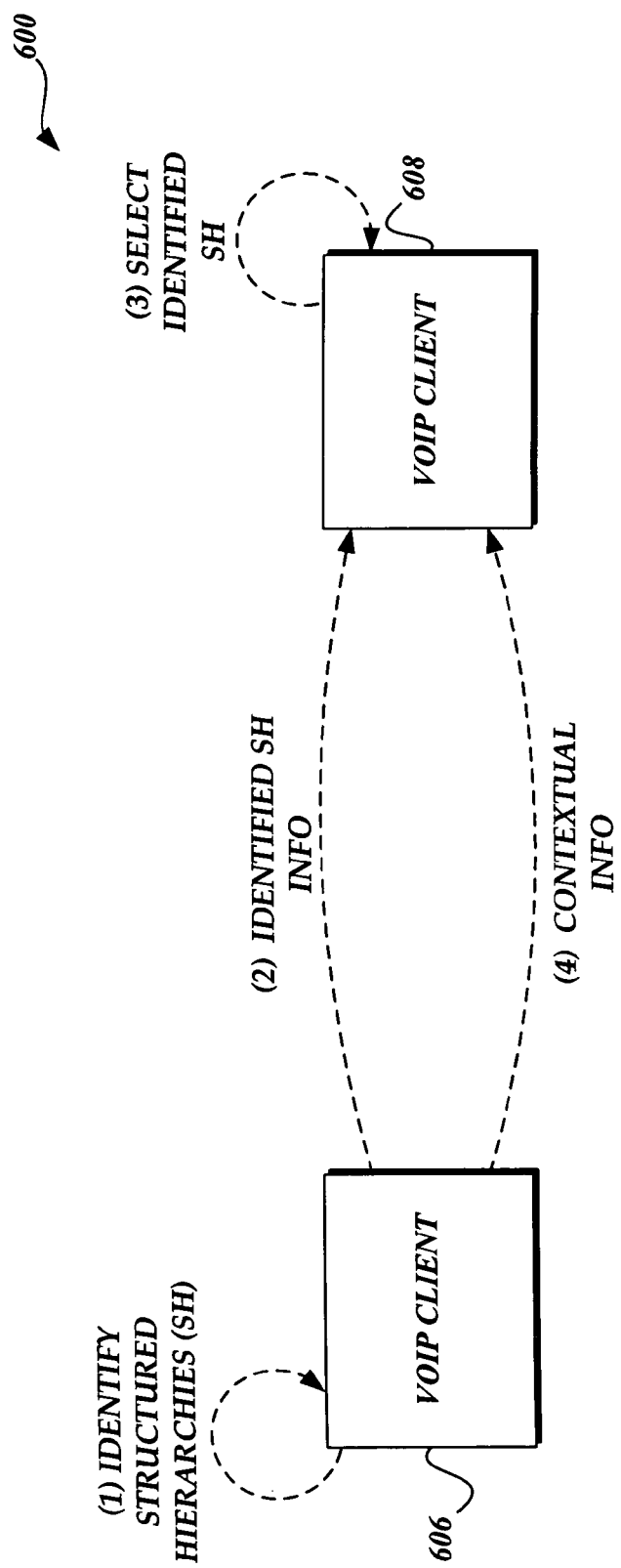
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Now with reference to FIGS. 7-8, aspects of the present invention that are directed at providing enhanced features in a voicemail system will be discussed in more detail. Those skilled in the art and others will recognize that an IP telephony environment 100 may include a voicemail system that allows a caller to leave an audio and/or multimodal message (e.g., audio with an electronic file) for a callee. For example, a VoIP service provider 132 may provide VoIP clients 134 with voicemail services that allow a caller to leave voicemail messages in a voice mailbox for a callee. In this regard, a service provider 132 may automatically forward a data stream to a local client device associated with the callee that includes audio information, media information, and/or contextual information. In some instances, the callee may access a voicemail message from a local client device using a voicemail or email application.

With existing systems, a callee is not able to obtain certain contextual data with a voicemail message. For example, a callee may want to obtain a summary in which highly relevant data is made available without a callee being required to listen to the body of the voicemail message. If a summary of the voicemail message was available, then a callee may be able to easily prioritize and quickly process all received voicemail messages. Moreover, with existing systems, a callee is not able to easily modify the audio in the body of a received voicemail message. In this regard, a callee may want to change certain audio properties (e.g., volume, bass, treble, etc.) and/or multiplex the voicemail message with other audio data.

One aspect of the present invention is directed at software that processes a received voicemail message to provide enhanced features in a voicemail system. In one embodiment, audio data is processed to provide enhanced contextual data to a callee. In another embodiment, controls are provided that allow a callee to navigate and/or modify the audio data that is included in a received voicemail message.

Now with reference to FIG. 7, a processing routine 700 with logic used to provide enhanced contextual data with a voicemail message over conventional systems will be described. As illustrated in FIG. 7, the processing routine 700 begins a block 702 and at block 704, a callee creates a configurable voicemail account. In this regard, a wizard or similar input system may be employed to interact with a callee to create or update the configuration of the voicemail account.

In one embodiment, a service provider maintains a voicemail account on a centralized computer system that stores account information along with a callee's incoming and outgoing voicemail messages. When a callee accesses a received voicemail message, a communication channel is established between a local client associated with the callee and a remote client associated with the service provider. As mentioned previously, a communication channel may be established to transmit data between remote clients. In this regard, contextual information that identifies the communication as a type for accessing a voicemail system may be defined using the call basics class 902, described in further detail below with reference to FIG. 10. In another embodiment, an application program may provide services for storing and accessing voicemail messages on the local client.

When a voicemail account is created or sometime thereafter, preferences for having contextual data made available to a callee are obtained. As mentioned previously, voicemail messages may be accessed in a number of different ways. In this regard, a voicemail message may be downloaded from a centralized computer system to a local client as an attachment to an email message. In this example, the callee may input preferences, at block 704, to have enhanced contextual data such as a voicemail summary made available in the body of the email message. Similarly, a voicemail message may be accessed from a centralized computer system using a voicemail application that provides services for receiving and sending voicemail messages. In this example, a callee may establish preferences (at block 704) to have a voicemail summary made available, along with other contextual data, on a field of the user interface provided by the voicemail application. By way of another example, a callee may use a limited-feature client device such as a POTS or wireless telephone to access an audio menu managed by a service provider. In this example, the preferences associated with a voicemail account define how contextual data will be made available from the audio menu. A callee may establish a preference, at block 704, to have a voicemail message summary automatically provided at the audio menu using a Text-to-Speech ("TTS") engine. Alternatively, a callee may establish preferences to have the voicemail summary or other contextual data made available from the audio menu only on demand. While specific examples of preferences that may be established by a callee have been described, those skilled in the art and others will recognize that other types of preferences may be established without departing from the scope of the claimed subject matter.

At block 706, the processing routine 700 selects a received voicemail message. As described in further detail below, aspects of the present invention process a selected voicemail message for the purpose of providing enhanced features in a voicemail system. Those skilled in the art and others will appreciate that the processing performed on the selected voicemail message may occur on a remote client such as a centralized computer system associated with a service provider or on a local client. In this regard, a single voicemail message may be processed when received or sometime thereafter. Alternatively, a plurality of voicemail messages may be selected and processed by the processing routine 700 as "batch jobs" prior to or after being forwarded to a local client.

At block 707, an index of the conversational data packets in the body of the selected voicemail message is generated. By indexing the conversational data packets, aspects of the present invention may reformat an audio stream when handling a request to modify audio in a received voicemail message. For example and as described in further detail below, the index generated at block 707, may be referenced to identify which packets in a received voicemail message will be modified. Moreover, by indexing the conversational data packets, controls for quickly navigating to any location in the body of a voicemail message may be provided.

Figure 7:
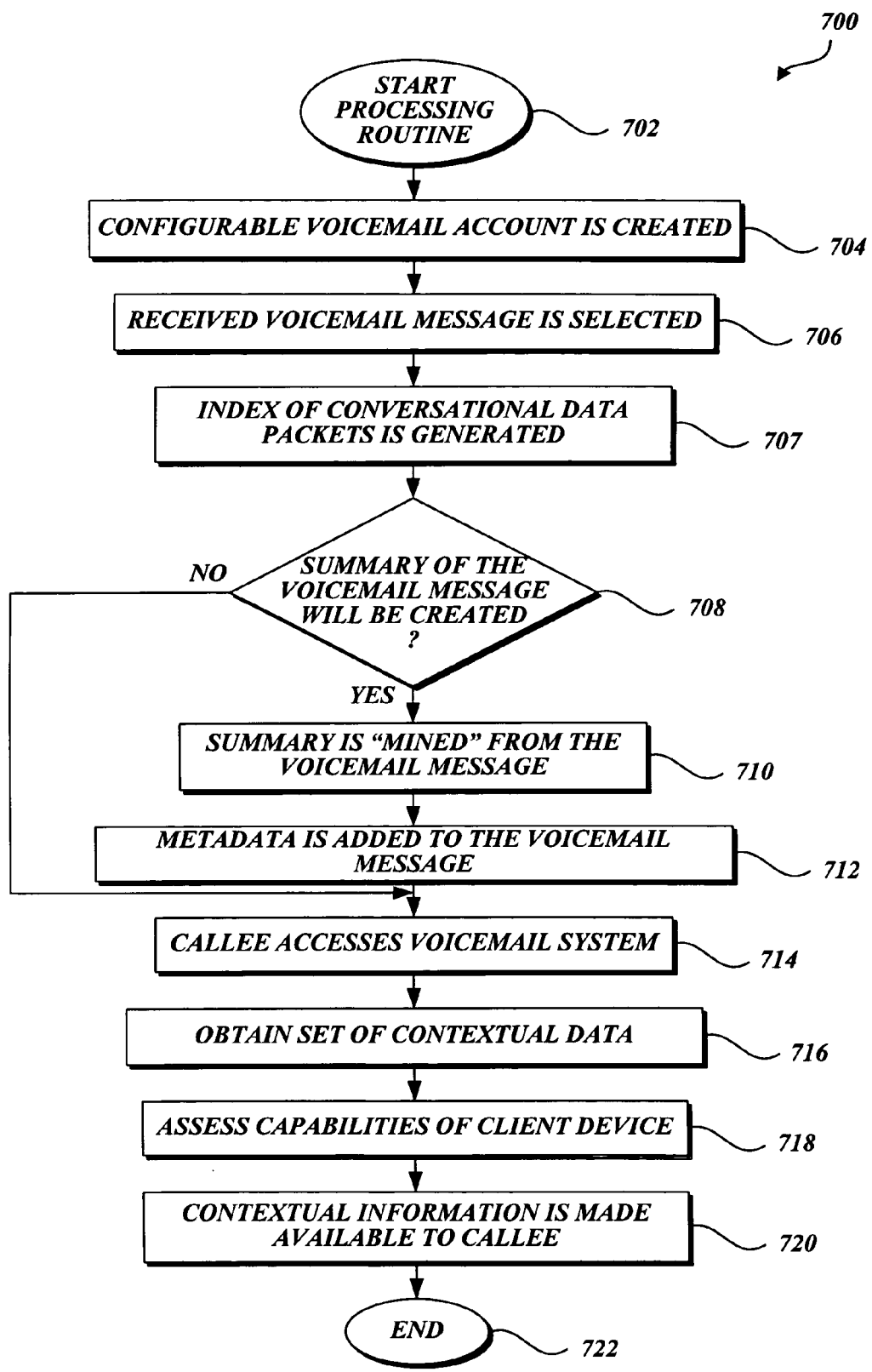
FIG. 7 is a flow diagram of a processing routine for identifying enhanced contextual data associated with a voicemail message that will be made available to a callee.

As illustrated in FIG. 7, at block 708, the processing routine 700 determines whether a summary of the selected voicemail message will be created. In one embodiment, settings associated with a voicemail account define preferences in regard to providing contextual data with a voicemail message. Preferences established by a callee, a third-party, or by default may be used to determine whether a summary of a voicemail message will be created. Moreover, different preferences may be established depending on the client device that is used to access a voicemail message. For example, if the callee uses a feature-rich client device to access a voicemail message, a first set of preferences may be used to determine whether a summary of the voicemail message will be created. Conversely, if a voicemail message is accessed from an audio menu using a limited-feature client device, a second set of preferences may be used to determine whether a summary of the voicemail message will be created. In this regard and as mentioned previously, a callee may establish preferences to have the summary or other contextual data made available automatically at the audio menu or only on demand. In any event, if a summary of a voicemail message will be created, the processing routine 700 proceeds to block 710. Conversely, if a summary of the voicemail message will not be created, the processing routine 700 proceeds to block 714, described in further detail below.

At block 710, a summary of a received voicemail is "mined" or extracted from conversational and/or contextual data packets associated with the selected voicemail message. Preferences established by a callee, a third party, or by default, may dictate that a summary of a voicemail message will be created. For example, a callee may establish a preference to have a voicemail message summary automatically created and inserted into the body or subject line of an email message when a callee uses an email application to access a voicemail message. In this instance, the identification of the summary may involve using a voice-recognition engine to convert audio in the body of a voicemail message to text. Then, generic techniques for using the text to create a summary may be applied. For example, all of or a highly relevant section of the body of the voicemail message, such as the first five (5) seconds of audio, may be converted from audio to text and used as the summary. Alternatively, a summary may be created by identifying statistically significant keywords from text that, through empirical analysis, have been identified as having a high probability of being relevant to the callee.

In other embodiments, the "mining" of audio data performed at block 710 use targeted filtering techniques. For example, a callee or third party may mine voicemail messages to have a summary created when particular content of interest is identified. In this regard, a callee or third-party may establish a mining profile in which data packets included in a voicemail message are searched for specific topics or categories of interest. More specifically, one or more mining profiles may include an identifier to search for keywords or identify voicemail messages that include references to specified terms.

At block 712, metadata that references the summary identified by the processing routine 700 at block 710 is added to the selected voicemail message. As mentioned previously, contextual data associated with a voicemail message is defined in metadata. At block 712, the summary identified by mining the body of the voicemail message is referenced in the metadata of the voicemail message. As a result, an application that accesses the voicemail message is able to present the summary along with other contextual data. In one embodiment, the metadata that references the summary may be communicated between remote clients as identifiers provided by the Call Basics Class 902, described in further detail below with reference to FIG. 10.

At block 714 a callee accesses a voicemail system that manages the callee's voicemail account. As mentioned previously, a callee may access a voicemail account from a local client using an email application, voicemail application, etc., and have contextual data exchanged in accordance with structural hierarchies. In this example, one or more voicemail messages may be "downloaded" from a centralized server maintained by the callee's service provider. Also, a callee may access voicemail messages from an audio menu using a limited-feature client that is only capable of sending or receiving audio data. In any event, at block 714, a callee accesses a voicemail system that manages a callee's received voicemail messages.

At block 716, the processing routine 700 obtains a set of contextual data that is associated with the client/callee that accessed the voicemail system, at block 714. When the voicemail system is accessed, a communication channel may be established between clients associated with a callee and the callee's service provider. In this regard, the service provider may have some of the callee's contextual data stored and/or may receive some of the contextual data automatically over the communication channel in the form of structured hierarchies. As mentioned previously, structured hierarchies may be used for representing contextual data over a conversation channel in an IP network environment. In this regard, structured hierarchies are predefined organizational structures for arranging contextual data to be exchanged between two or more clients. For example, structured hierarchies can be defined by hierarchical organizations of various classes and attributes, such as XML namespaces. In this regard, specific examples of structured hierarchies that may be used to exchange contextual data are described below with reference to FIGS. 9-13.

Upon the contextual data associated with the client/callee being obtained, the processing routine 700 uses the contextual data to assess the capabilities of the client used to access the voicemail system at block 718. As mentioned previously, a callee may employ any number of different clients to access a voicemail system, with each client having potentially different capabilities. For example, some feature-rich clients may be able to provide a callee with contextual data in a number of different formats including, but not limited to audio, text, and/or image. Other clients are more limited and, for example, may only be able to communicate contextual data to the callee in an audio format. Aspects of the present invention make contextual data available to a callee in potentially many different formats. Since the capabilities of the client used to access the voicemail system may affect how and whether the contextual data will be made available, the capabilities of the client are assessed.

At block 720, contextual data that may include the summary of a voicemail message is made available to a callee. One user interface for presenting contextual data to a callee is described below with reference to FIG. 8. In this exemplary embodiment, the contextual data is presented to the callee in a text-based format. However, it should be well understood that a callee may prefer or be limited to accessing the contextual data in a different format. For example, in one embodiment, the summary of a voicemail message is identified using a voice-recognition engine that converts audio to text. However, a callee may prefer or be limited to accessing the contextual data in an audio-based format. In this instance, presenting the contextual data to the callee, at block 720, may include performing a conversion between different formats using a Text-to-Speech ("TTS") engine, for example. Moreover, it should be well understood that the processing routine 700 may be configured to present contextual data when a callee is notified of the existence of a voicemail message. For example, if the callee obtains voicemail messages as email attachments, a voicemail message summary may be included in the body of the email. Similarly, a voicemail application may include a Graphical User Interface ("GUI") with a field or other GUI element designated to present the summary. Then the processing routine 700 proceeds to block 722, where it terminates.

Now with reference to FIG. 8, an exemplary user interface 800 that may be used to interact with a callee to implement aspects of the present invention will be described. In accordance with one embodiment, the user interface 800 is accessed from a voicemail application program that manages voicemail messages received by a callee. A control accessible from the voicemail application (e.g., button, menu item, etc.) allows the callee to "drill down" to access the user interface 800. For example, a callee may "right click" on an entry that represents a voicemail message to access a "pop-up" menu. When the appropriate menu item is selected from the "pop-up" menu, the user interface 800 is presented. In accordance with one embodiment, the user interface 800 is a GUI with readily understandable controls, such as icons, scroll bars, buttons, links, menus, etc. While the description provided below depicts the user interface 800 as being a GUI with specific controls, those skilled in the art and others will recognize that aspects of the present invention may be applied in other contexts.

The controls accessible from the user interface 800 are included in a header region 802 and a modification region 804. In this embodiment, the header region 802 includes a plurality of fields 806, 808, 810, 812 and a summary textbox 814 that each present different types of contextual data associated with a voicemail message to a callee. The modification region 804 includes a progress bar 816 and a plurality of selectable controls associated with the progress bar 816, including a "PLAY" button 818, a "PAUSE" button 820, and a "OVERLAY" button 822. Moreover, the modification region 804 includes additional controls for modifying audio in the received voicemail message, including a "VOLUME" slider 824, "BASE" slider 826, and a "TREBLE" slider 828.

The header region 802 presents different categories of contextual data associated with a selected voicemail message. In the exemplary user interface 800 depicted in FIG. 8, the header region 802 includes a "FROM" field 806, "TO" field 808, "CARBON COPY" field 810, and a "SUBJECT" field 812. The contextual data presented in the fields 806, 808, 810, and 812 are defined in the metadata in the received voicemail message. In this regard, the header region 802 includes a "FROM" field 806 and "TO" field 808 that identifies the author and recipients of the voicemail message, respectively. Similarly, any contacts who were provided with a "carbon copy" of the voicemail message are identified in the "CARBON COPY" field 810.

Figure 8:
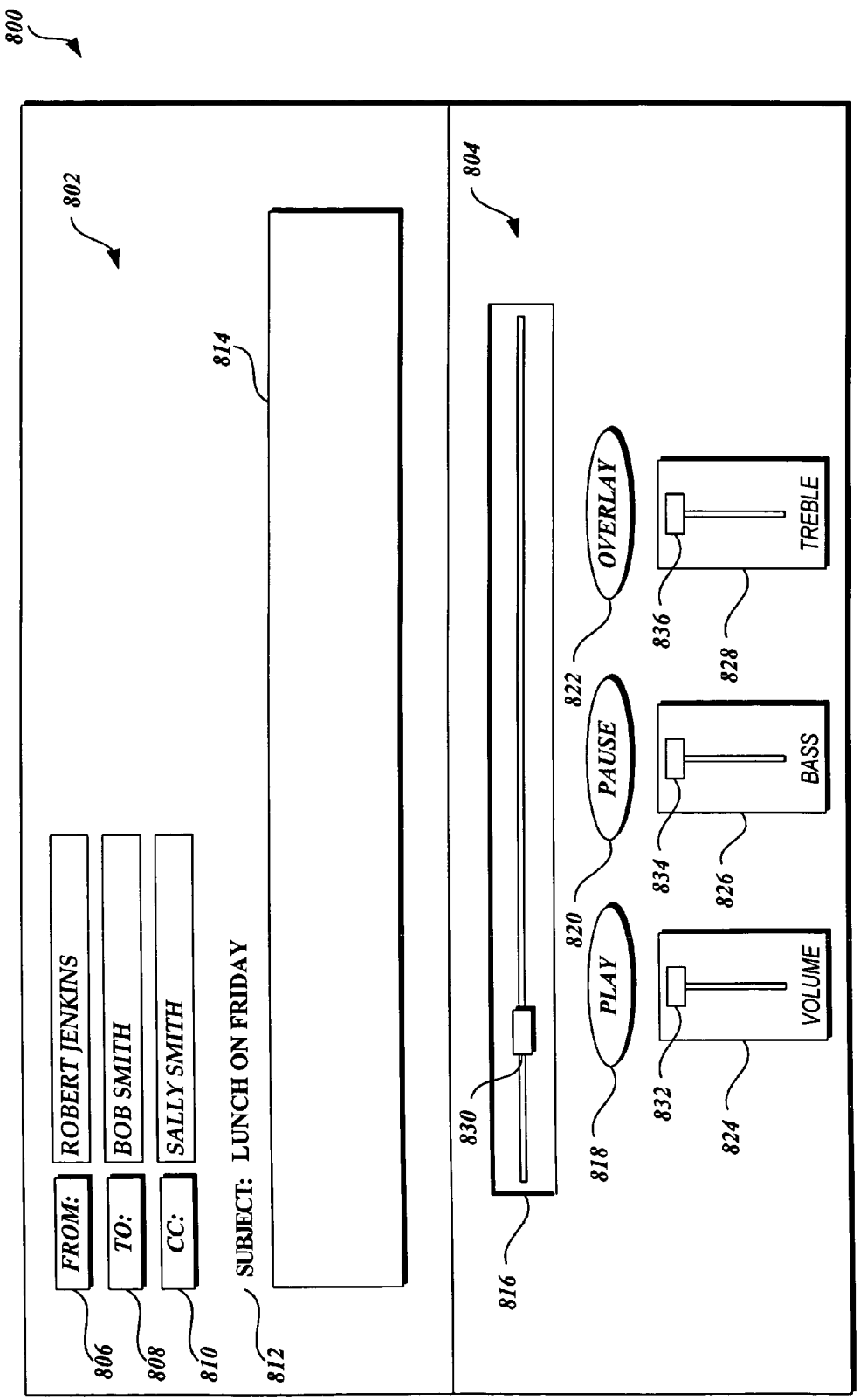
FIG. 8 is a pictorial depiction of an exemplary user interface that accepts commands for modifying a received voicemail message in accordance with one embodiment of the present invention.
Figure 9:
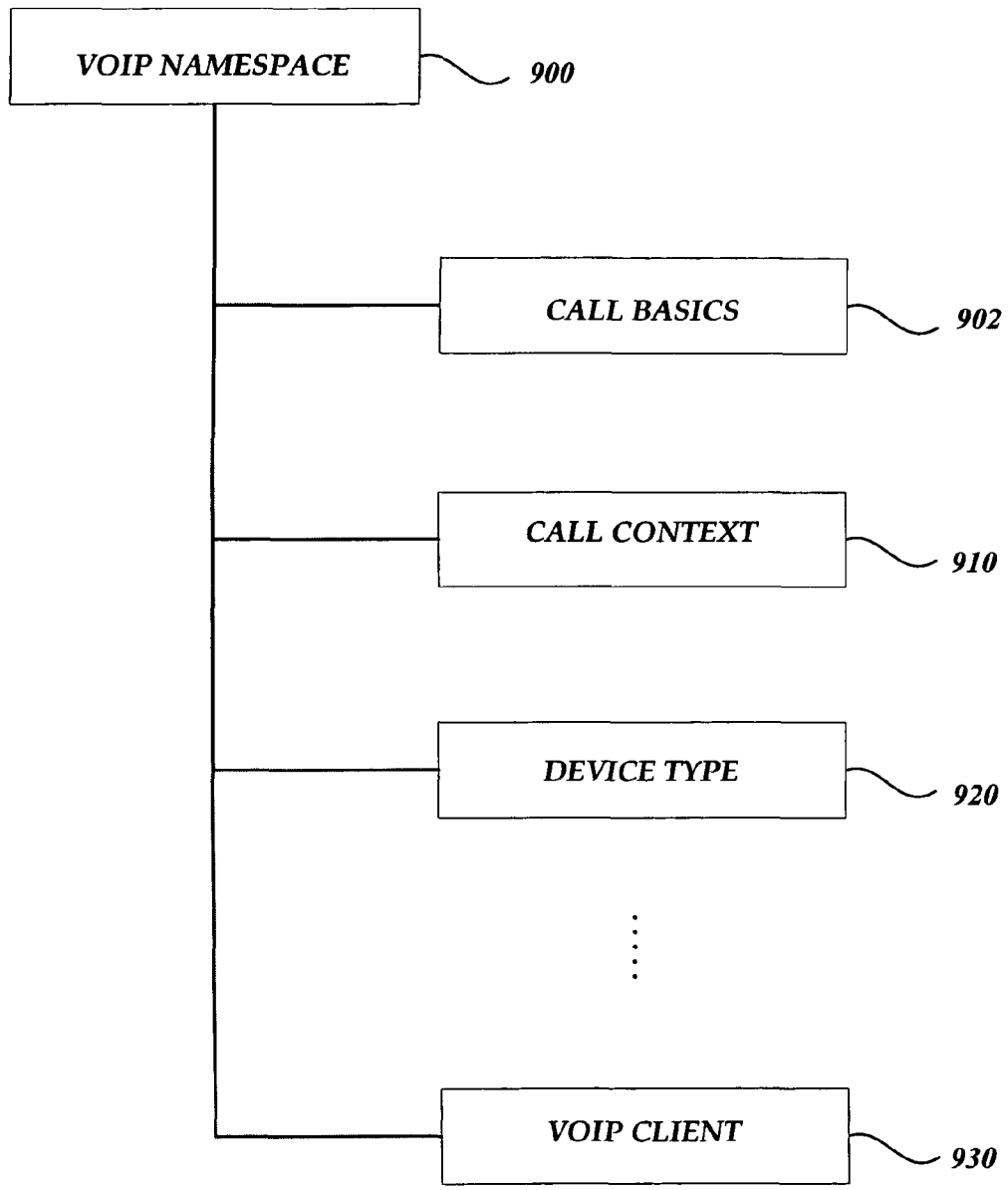
FIGS. 9-13 are block diagrams illustrative of various attribute and classes of structured hierarchies corresponding to VoIP contextual information in accordance with an aspect of the present invention.

The header region 802 depicted in FIG. 8 also includes a "SUBJECT" field 812 and a summary textbox 814. In accordance with one embodiment, contextual data "mined" from the body of a voicemail message by the processing routine 700 (FIG. 7) may be presented in the "SUBJECT" field 812, the summary textbox 814, or any combination thereof. As mentioned previously, a voicemail message summary may be identified using a voice-recognition engine that converts audio in the body of the voicemail message to text. Then, generic or targeted filtering techniques may be used to identify a voicemail message summary that may be presented to a callee on the user interface 800. Alternatively, when authoring a voicemail message a caller may manually input text that may be presented in either the "SUBJECT" field 812 or the summary textbox 814 when the voicemail message is received.

From the user interface 800, controls for playing, pausing, and/or multiplexing data with a received voicemail message are provided. In the example depicted in FIG. 8, a "PLAY" button 818, "PAUSE" button 820, and "OVERLAY" button 822 are available to a callee. By selecting the "PLAY" button 818 a callee issues a command to listen to the body of a voicemail message. As the body of the voicemail message is being played, a callee may activate the "PAUSE" button 820 to temporarily suspend playback. In this regard, the progress bar 816 depicted in FIG. 8 provides dynamic visual updates regarding the extent to which a data stream included in the body of a voicemail message has been played. Any type of audio system accessible from a client device and/or a media player program may be used to play and pause the body of the voicemail message.

By selecting the "OVERLAY" button 822, the callee may identify an electronic file that will be multiplexed with the selected voicemail message. For example, when the "OVERLAY" button 822 is activated, a callee may browse a local or network accessible location and identify an audio file that will be multiplexed with the selected voicemail message. In this instance, the callee may save the modified voicemail message on local storage. Moreover, the voicemail application may be used to transmit the modified voicemail message, in the form of the single multiplexed data stream, to a secondary callee.

Controls available from the user interface 800 allow a callee to quickly navigate to any location in the body of the selected voicemail message. In accordance with one embodiment, while the body of the voicemail message is being played, a callee may select the button 830 included in the progress bar 816. Then, using a technique known as "drag-and-drop," a callee may generate input to forward or rewind between data packets included in the body of the voicemail message. As mentioned previously, an index of the conversational data packets in a voicemail message is generated by the processing routine 700 (FIG. 7). When a callee generates input to navigate between locations in a voicemail message, aspects of the present invention receive a set of event data that describes the movement of the button 830. More specifically, the index positions of the corresponding data packets where the callee initiated and ended movement of the button 830 are identified. Then, playback of the stream of data packets continues at the index position where the callee ended movement of the button 830.

Controls available from the user interface 800 allow a callee to modify attributes of data packets included in the voicemail message. In this regard, the modification region 804 includes a "VOLUME" slider 824, a "BASE" slider 826, and a "TREBLE" slider 828. In accordance with one embodiment, while the body of the voicemail message is being played, a callee may select any of the buttons 832, 834, or 836. Then, using the same drag-and-drop technique described above, a callee may generate input to modify the audio attributes (e.g., volume, bass, treble) of the voicemail message. More specifically, when the voicemail message begins playing, the buttons 832, 834, and 836 are displayed at locations respective of the current audio attributes of the data packets being played. By moving the buttons 832, 834, or 836 a callee generates input to modify these attributes. In response, aspects of the present invention receive a set of event data that describes the button movement. Then, any type of media player program capable of modifying the specified attributes of the data packets may be used to implement the modifications requested by the callee. In this way, the user interface 800 provides an easy and convenient way for a callee to modify the attributes of a received voicemail message.

It should be well understood that other types of data and controls may, and typically will, be presented to a callee on the user interface 800. For example, the user interface 800 is depicted as providing controls for allowing a callee to modify specific audio attributes of a received voicemail message. However, those skilled in the art and others will appreciate that other types of controls may be provided without departing from the scope of the claimed subject matter. More generally, while illustrative embodiments of the present invention have been illustrated and described, it will be appreciated that various changes can be made therein without departing from the spirit and scope of the invention.

With reference to FIGS. 9-13, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 900. In one embodiment, the VoIP namespace 900 is represented as a hierarchically structured tree of nodes, each node corresponding to a subclass which corresponds to a subset of VoIP contextual information. For example, a VoIP Namespace 900 may be defined as a hierarchically structured tree comprising a Call Basics Class 902, a Call Contexts Class 910, a Device Type Class 920, a VoIP Client Class 930, and the like.

Figure 10:
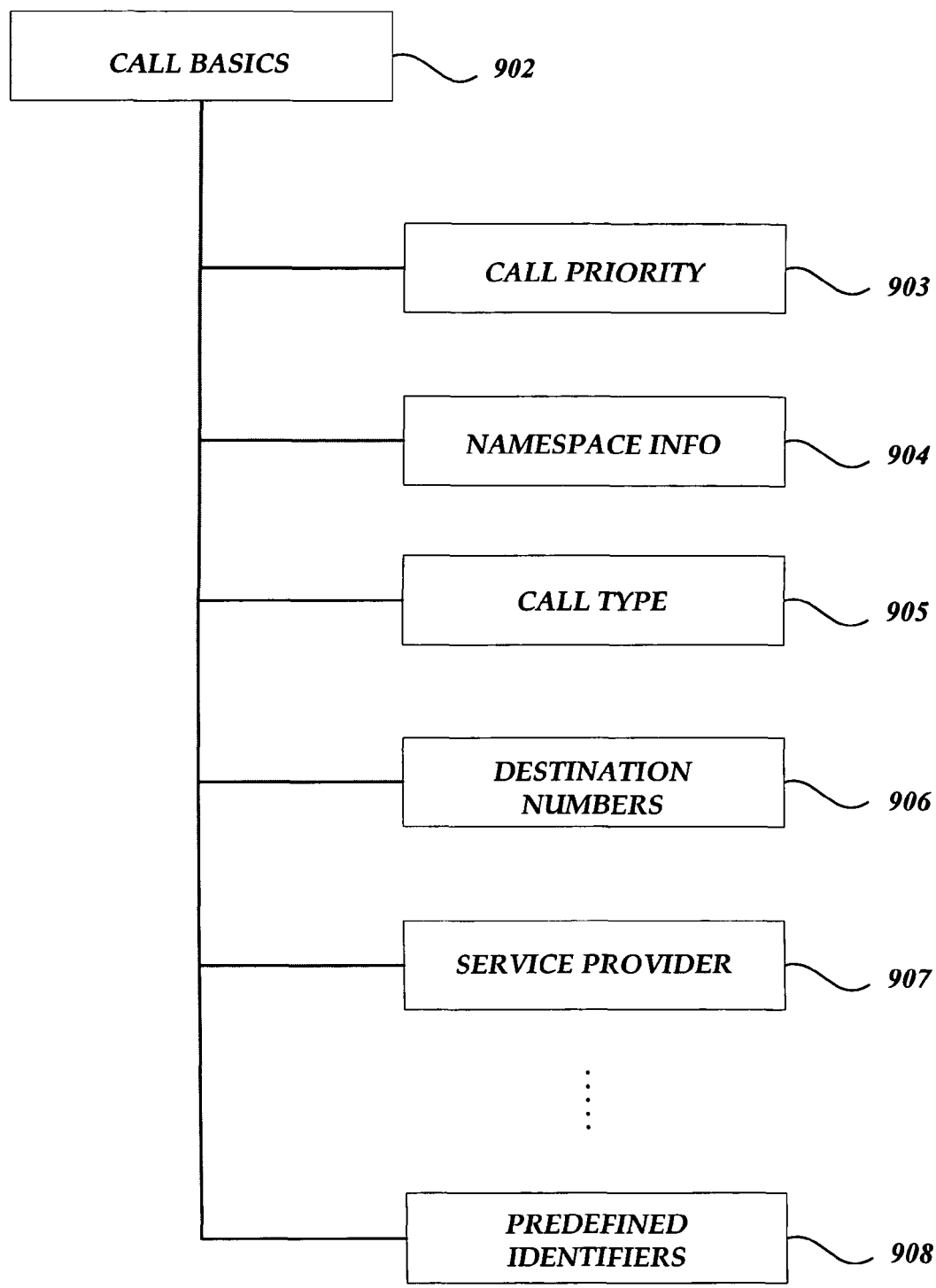

With reference to FIG. 10, a block diagram of a Call Basics Class 902 is shown. In an illustrative embodiment, Call Basics Class 902 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, a communication to access a voicemail system, etc. In one embodiment, the contextual information relating to a conversation channel may include data that summarizes the content of a voicemail message. In one embodiment, a Call Basics Class 902 may be defined as a sub-tree structure of a VoIP Namespace 900, which includes nodes such as call priority 903, namespace information 904, call type 905, destination numbers 906, service provider 907, predefined identifiers 908, and the like.

Figure 11:
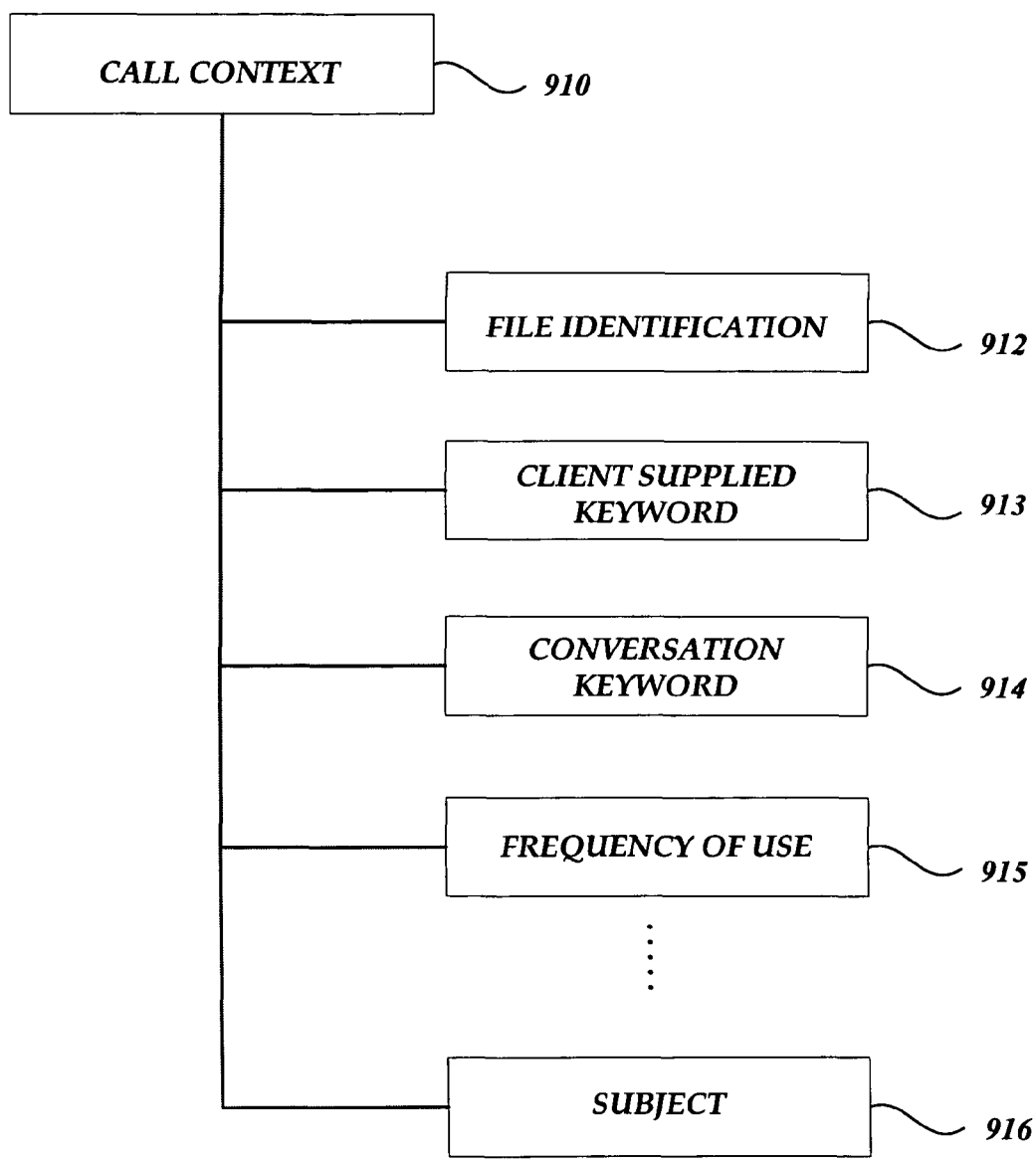

With reference to FIG. 11, a block diagram of a Call Contexts Class 910 is shown. In one embodiment, a subset of VoIP contextual information relating to conversation context may correspond to the Call Contexts Class 910. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 910 may be defined as a sub-tree structure of a VoIP Namespace 900, which includes nodes corresponding to file identification 912, client supplied keyword 913, conversation keyword 914, frequency of use 915, subject of the conversation 916, and the like.

Figure 12:
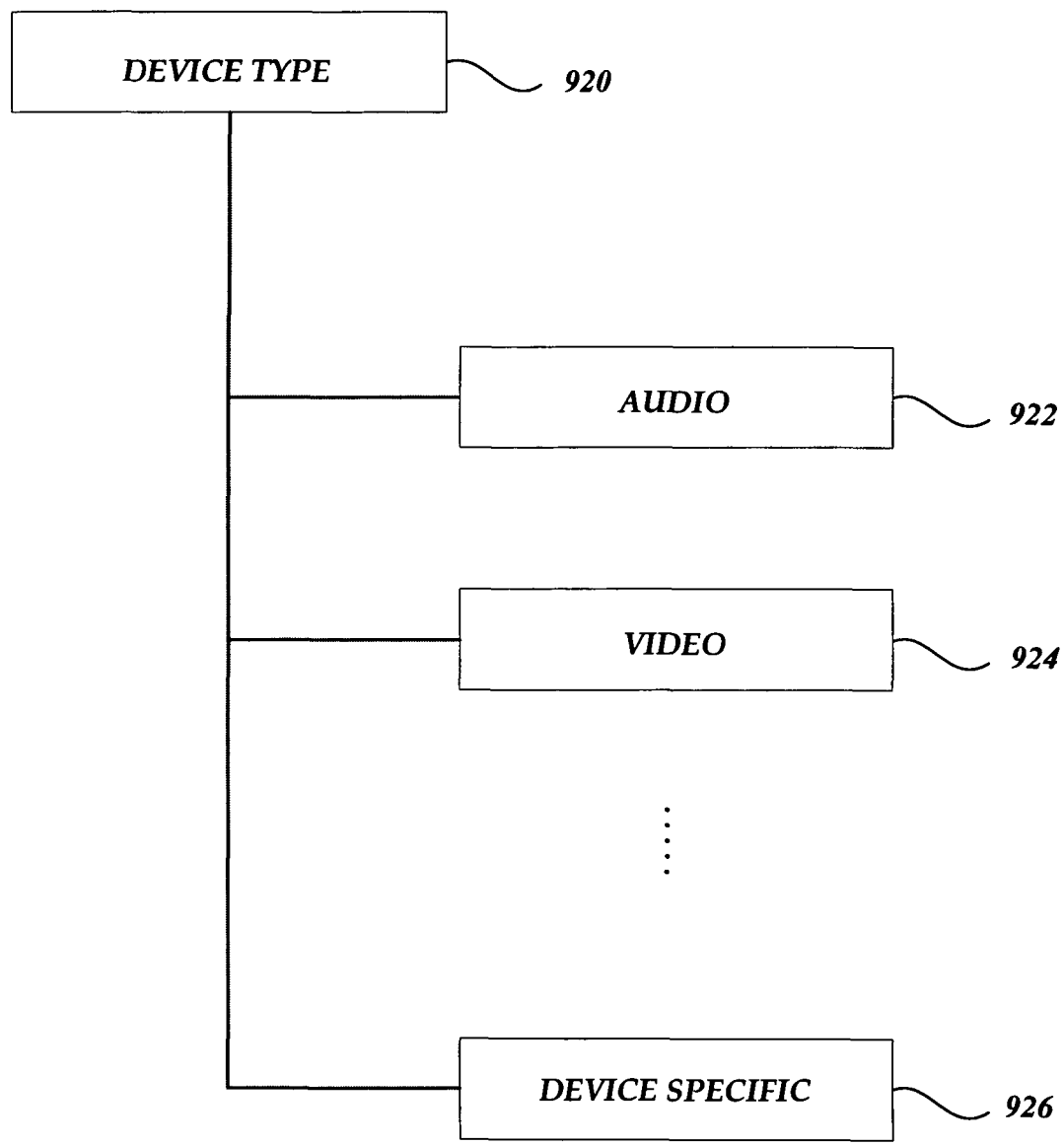

With reference to FIG. 12, a block diagram of a Device Type Class 920 is depicted. In one embodiment, a Device Type Class 920 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type, and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 920 may be defined as a sub-tree structure of a VoIP Namespace 900, which includes nodes corresponding to Audio 922, Video 924, Device Specific 926, and the like.

Figure 13:
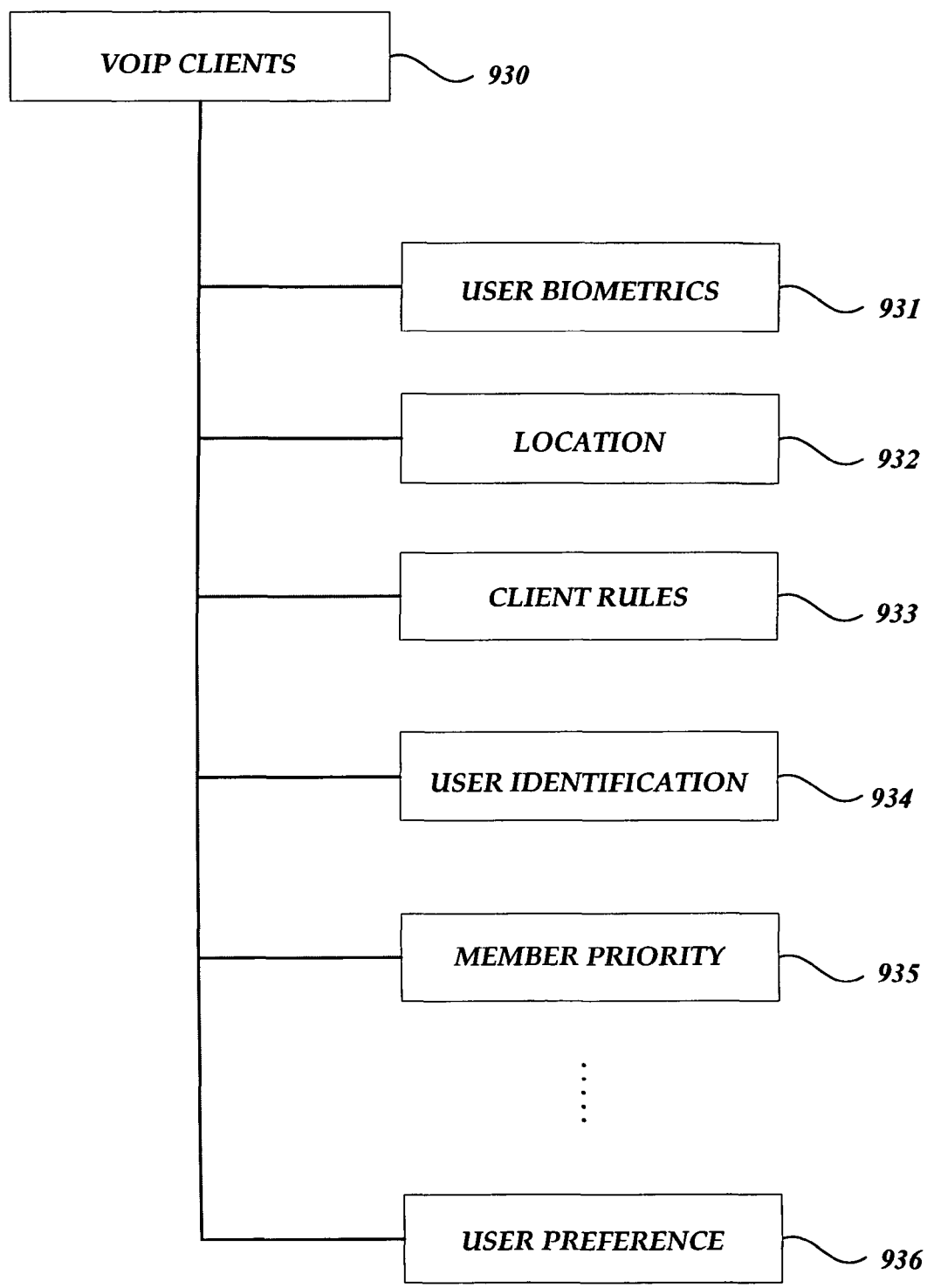

With reference to FIG. 13, a block diagram of a VoIP Client Class 930 is depicted. In accordance with an illustrative embodiment, a VoIP Client Class 930 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 930 may be defined as a sub-tree structure of a VoIP Namespace 900, which includes nodes corresponding to user biometrics 931, location 932, client rules 933, user identification 934, member priority 935, user preference 936, and the like.

The invention claimed is:

1. In a digital voice communication environment operative to transmit a voicemail message to a client associated with a callee, a method of providing the callee with access to a summary of the voicemail message, the method comprising:
   providing a user interface used to interact with the voicemail message that includes controls used in modifying audio attributes of the voicemail message;
   displaying on the user interface a bass control for adjusting a bass of the voicemail message, a treble control for adjusting a treble of the voicemail message and a volume control for adjusting a volume of the voicemail message;
   displaying on the user interface an overlay button that when selected is used to determine an electronic audio file to multiplex with the voicemail message;
   displaying on the user interface a from field that identifies an author of the voicemail message, a to field that identifies recipients of the voicemail message, and a carbon copy field that identifies any further recipients and a subject field and a summary textbox;
   determining a type of client device that is accessing the voicemail message; wherein the voicemail message comprises contextual data packets and conversational data packets;
   indexing the conversational data packets of the voicemail message used for navigation within the voicemail;
   determining when the summary will be created and when the summary will not be created for the voicemail message, comprising accessing a first set of preferences when the type of the client device is a limited-feature device to determine whether or not to create the summary and accessing a second set of preferences when the type of the client device is a feature-rich device to determine whether or not to create the summary;
   when the summary is to be created, performing actions, comprising:
   identifying when the voicemail includes a specified term;
   identifying a set of data that will be included in the summary; wherein the type of client device that is accessing the voicemail message is used in identifying the set of data to be included in the summary;
   extracting the set of data that will be included in the summary from the voicemail message; and
   making the summary available on the client.

2. The method as recited in claim 1, wherein identifying a set of data that will be included in the summary includes creating a configurable voicemail account that defines preferences of the callee.

3. The method as recited in claim 1, wherein identifying a set of data that will be included in the summary includes indexing packets in the body of the voicemail message.

4. The method as recited in claim 3, further comprising:
   receiving input to modify the audio attributes of the voicemail message; and
   using the index to identify the conversational data packets that will be modified.

5. The method as recited in claim 1, wherein extracting the set of data that will be included in the summary from the voicemail message includes using a voice-recognition engine to convert audio to text.

6. The method as recited in claim 5, further comprising inserting the summary into the body of an email message.

7. The method as recited in claim 1, wherein extracting the set of data that will be included in the summary from the received voicemail message includes using targeted filtering techniques to identify voicemail messages that reference a specified term.

8. The method as recited in claim 1, wherein making the summary available on the client includes inserting metadata that references the summary into the voicemail message.

9. The method as recited in claim 1, wherein making the summary available on the client includes:
   determining the capabilities of the client device being used to access a voicemail system; and
   converting the summary into a format that may be accessed from the client based on the determined capabilities.

10. The method as recited in claim 1, wherein making the summary available on the client includes providing a user interface where a callee may generate an event to modify audio attributes of the voicemail message.

11. A computer-readable storage medium, excluding a signal, containing computer-readable instructions which, when executed in a client performs a method of allowing a callee to modify audio attributes of a voicemail message, the method comprising:
   providing a user interface used to interact with the voicemail message that includes controls used in modifying audio attributes of the voicemail message;
   displaying on the user interface a bass control for adjusting a bass of the voicemail message, a treble control for adjusting a treble of the voicemail message and a volume control for adjusting a volume of the voicemail message;
   displaying on the user interface an overlay button that when selected is used to determine an electronic audio file to multiplex with the voicemail message;
   displaying on the user interface a from field that identifies an author of the voicemail message, a to field that identifies recipients of the voicemail message, and a carbon copy field that identifies any further recipients and a subject field and a summary textbox;
   determining a type of client device that is accessing the voicemail message; wherein the voicemail message comprises contextual data packets and conversational data packets;
   indexing the conversational data packets of the voicemail message used for navigation within the voicemail;
   determining when the summary will be created and when the summary will not be created for the voicemail message, comprising accessing a first set of preferences when the type of the client device is a limited-feature device to determine whether or not to create the summary and accessing a second set of preferences when the type of the client device is a feature-rich device to determine whether or not to create the summary;

when the summary is to be created, performing actions, comprising:

identifying when the voicemail includes a specified term;

identifying a set of data that will be included in the summary; wherein the type of client device that is accessing the voicemail message is used in identifying the set of data to be included in the summary;

extracting the set of data that will be included in the summary from the voicemail message; and making the summary available on the client.

12. The computer-readable storage medium as recited in claim 11, wherein identifying a set of data that will be included in the summary includes creating a configurable voicemail account that defines preferences of the callee.

13. The computer-readable storage medium as recited in claim 11, further comprising using the index to identify the conversational data packets that will be modified.

14. The computer-readable storage medium as recited in claim 11, wherein:

the user interface is further configured with controls for navigating to any location in the body of the voicemail message;

in response to receiving input to navigate to a specified data packet in the voicemail message;

receiving a set of event data that describes the input generated by the callee; and using an index to identify a location where playback of the voicemail message will continue.

15. The computer-readable storage medium as recited in claim 14, wherein a control for navigating to a location in the body of the voicemail message allows the callee to forward playback of the voicemail message to a data packet that is subsequent to the current data packet.

16. The computer-readable storage medium as recited in claim 14, wherein a control for navigating to a location in the body of the voicemail message allows the callee to rewind playback of the voicemail message to a previous data packet.

17. The computer-readable storage medium as recited in claim 11, wherein the event data that describes the input generated by the callee includes the identity of a control selected by the callee and the index positions of the data packets where the callee initiated and ended movement of the control.

18. A system, comprising:

a processor and a computer-readable storage medium, excluding a signal;

a user interface used to interact with the voicemail message that includes controls used in modifying audio attributes of the voicemail message;

displaying on the user interface a bass control for adjusting a bass of the voicemail message, a treble control for adjusting a treble of the voicemail message and a volume control for adjusting a volume of the voicemail message;

displaying on the user interface an overlay button that when selected is used to determine an electronic audio file to multiplex with the voicemail message;

displaying on the user interface a from field that identifies an author of the voicemail message, a to field that identifies recipients of the voicemail message, and a carbon copy field that identifies any further recipients and a subject field and a summary textbox;

determining a type of client device that is accessing the voicemail message; wherein the voicemail message comprises contextual data packets and conversational data packets;

indexing the conversational data packets of the voicemail message used for navigation within the voicemail;

determining when the summary will be created and when the summary will not be created for the voicemail message, comprising accessing a first set of preferences when the type of the client device is a limited-feature device to determine whether or not to create the summary and accessing a second set of preferences when the type of the client device is a feature-rich device to determine whether or not to create the summary;

when the summary is to be created, performing actions, comprising:

identifying when the voicemail includes a specified term;

identifying a set of data that will be included in the summary; wherein the type of client device that is accessing the voicemail message is used in identifying the set of data to be included in the summary;

extracting the set of data that will be included in the summary from the voicemail message; and making the summary available on the client.

19. The system as recited in claim 18, wherein identifying a set of data that will be included in the summary includes creating a configurable voicemail account that defines preferences of the callee.

20. The system as recited in claim 18, further comprising inserting the summary into the body of an email message.

* * * * *